United States Patent
Kirsch et al.

(10) Patent No.: US 8,165,881 B2
(45) Date of Patent: Apr. 24, 2012

(54) SYSTEM AND METHOD FOR VARIABLE TEXT-TO-SPEECH WITH MINIMIZED DISTRACTION TO OPERATOR OF AN AUTOMOTIVE VEHICLE

(75) Inventors: David Michael Kirsch, Torrance, CA (US); Ritchie Winson Huang, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 908 days.

(21) Appl. No.: 12/202,034

(22) Filed: Aug. 29, 2008

(65) Prior Publication Data

US 2010/0057464 A1    Mar. 4, 2010

(51) Int. Cl.
*G10L 13/00* (2006.01)
*G10L 11/00* (2006.01)

(52) U.S. Cl. .......................... 704/260; 704/270; 704/275
(58) Field of Classification Search .................. 704/260, 704/270
See application file for complete search history.

(56) References Cited

U.S. PATENT DOCUMENTS

| | | |
|---|---|---|
| 3,281,959 A | 11/1966 | Kobler et al. |
| 4,831,654 A | 5/1989 | Dick |
| 5,051,924 A | 9/1991 | Bergeron et al. |
| 5,157,759 A | 10/1992 | Bachenko |
| 5,177,685 A | 1/1993 | Davis et al. |
| 5,309,546 A | 5/1994 | Baker et al. |
| 5,406,492 A | 4/1995 | Suzuki |
| 5,442,553 A | 8/1995 | Parrillo |
| 5,634,084 A | 5/1997 | Malsheen et al. |
| 5,736,941 A | 4/1998 | Schulte et al. |
| 5,761,640 A | 6/1998 | Kalyanswamy et al. |
| 5,774,071 A | 6/1998 | Konishi et al. |
| 5,774,854 A | 6/1998 | Sharman |
| 5,835,881 A | 11/1998 | Trovato et al. |
| 5,935,193 A | 8/1999 | Saiki |
| 5,950,161 A | 9/1999 | Kozuma et al. |
| 5,987,412 A | 11/1999 | Breen |
| 6,115,686 A | 9/2000 | Chung et al. |
| 6,148,285 A | 11/2000 | Busardo |

(Continued)

FOREIGN PATENT DOCUMENTS

EP    0777210    6/1997

(Continued)

OTHER PUBLICATIONS

European Search Report for European Patent Application 09168670.9-2225, mailed Oct. 1, 2009 (application corresponds to the present U.S. application).

(Continued)

*Primary Examiner* — Justin Rider
(74) *Attorney, Agent, or Firm* — Capitol City TechLaw (57) ABSTRACT

A text-to-speech (TTS) system implemented in an automotive vehicle is dynamically tuned to increase intelligibility over a wide variety of vehicle operating states and environmental conditions by tuning characteristics of the synthesized voice in response to measured operating states. To decrease distractions to an operator of the vehicle, an embodiment of the invention prevents updates to the synthesized voice character from taking effect while a message phrase is being played. Instead, voice characteristics are updated only during natural phrase breaks. In another embodiment of the invention, a damping filter is applied to calculated changes in voice characteristics to prevent excessively rapid changes from being applied, reducing the likelihood of distracting the vehicle operator. In another embodiment of the invention, both phrase-break detectors and damping filters are employed.

27 Claims, 7 Drawing Sheets

U.S. PATENT DOCUMENTS

| | | |
|---|---|---|
| 6,173,262 B1 | 1/2001 | Hirschberg |
| 6,173,263 B1 | 1/2001 | Conkie |
| 6,282,494 B1 | 8/2001 | Hsu |
| 6,363,342 B2 | 3/2002 | Shaw et al. |
| 6,400,809 B1 | 6/2002 | Bossemeyer, Jr. et al. |
| 6,405,027 B1 | 6/2002 | Bell |
| 6,446,040 B1 | 9/2002 | Socher et al. |
| 6,466,653 B1 | 10/2002 | Hamrick et al. |
| 6,539,080 B1 | 3/2003 | Bruce et al. |
| 6,557,026 B1 | 4/2003 | Stephens, Jr. |
| 6,604,038 B1 | 8/2003 | Lesesky et al. |
| 6,614,422 B1 | 9/2003 | Rafii et al. |
| 6,615,186 B1 | 9/2003 | Kolls |
| 6,636,801 B2 | 10/2003 | Curbow |
| 6,701,231 B1 | 3/2004 | Borugian |
| 6,757,262 B1 | 6/2004 | Weisshaar et al. |
| 6,944,430 B2 | 9/2005 | Besris |
| 6,964,023 B2 | 11/2005 | Maes et al. |
| 7,010,489 B1 | 3/2006 | Lewis et al. |
| 2002/0016655 A1 | 2/2002 | Joao |
| 2002/0072908 A1 | 6/2002 | Case et al. |
| 2002/0103582 A1 | 8/2002 | Ohmura et al. |
| 2003/0068020 A1 | 4/2003 | Hamrick et al. |
| 2003/0076842 A1 | 4/2003 | Johansson et al. |
| 2003/0105639 A1 | 6/2003 | Naimpally et al. |
| 2003/0134629 A1 | 7/2003 | Ollis et al. |
| 2003/0139179 A1 | 7/2003 | Fuchs et al. |
| 2003/0195814 A1 | 10/2003 | Striemer |
| 2003/0224840 A1 | 12/2003 | Frank et al. |
| 2004/0029619 A1 | 2/2004 | Liang et al. |
| 2004/0046744 A1 | 3/2004 | Rafii et al. |
| 2004/0048572 A1 | 3/2004 | Godfrey |
| 2004/0048577 A1 | 3/2004 | Godfrey et al. |
| 2004/0068370 A1 | 4/2004 | Moody et al. |
| 2004/0116141 A1 | 6/2004 | Loven et al. |
| 2004/0167781 A1 | 8/2004 | Hirayama |
| 2004/0193422 A1 | 9/2004 | Fado et al. |
| 2004/0233868 A1 | 11/2004 | Farnham |
| 2005/0033585 A1 | 2/2005 | Shields |
| 2005/0038656 A1 | 2/2005 | Simpson |
| 2005/0171694 A1 | 8/2005 | Schrimer et al. |
| 2005/0192714 A1 | 9/2005 | Fong et al. |
| 2005/0267757 A1 | 12/2005 | Iso-Sipila et al. |
| 2006/0161343 A1 | 7/2006 | Agnew et al. |
| 2006/0224385 A1 | 10/2006 | Seppala |
| 2006/0229873 A1 | 10/2006 | Eide et al. |
| 2006/0271275 A1 | 11/2006 | Verma |
| 2006/0271283 A1 | 11/2006 | Fraser et al. |
| 2006/0287787 A1 | 12/2006 | Engstrom et al. |
| 2007/0005206 A1 | 1/2007 | Zhang et al. |

FOREIGN PATENT DOCUMENTS

| | | |
|---|---|---|
| EP | 1327974 | 7/2003 |
| JP | 58109921 | 6/1983 |
| JP | 63065517 | 3/1988 |
| JP | 2001033256 A | 2/2001 |
| WO | 2007114086 A1 | 10/2007 |

OTHER PUBLICATIONS

European Search Report for European Patent Application 09168668.3-2225, mailed Oct. 1, 2009.

Office Action for European Patent Application 09168668.3-2225, Mar. 11, 2010.

SYSTEM AND METHOD FOR VARIABLE TEXT-TO-SPEECH WITH MINIMIZED DISTRACTION TO OPERATOR OF AN AUTOMOTIVE VEHICLE

BACKGROUND OF THE INVENTION

1. Field of the Invention

The invention relates generally to a system and method for dynamically optimizing parameters of a text-to-speech ("TTS") system in response to automotive vehicle environmental conditions in order to maximize the intelligibility of a synthesized TTS voice. In particular, the invention is focused on a method of optimizing the TTS voice while minimizing distractions to a vehicle operator.

2. Description of Related Art

Systems incorporating text-to-speech ("TTS") engines or synthesizers coupled to a database of textual data are well known and continue to find an ever-increasing number of applications. For example, automobiles equipped with TTS and speech-recognition capabilities simplify tasks that would otherwise distract a driver from driving. The uses of TTS systems in vehicles include controlling electronic systems aboard the vehicle, such as navigation systems or audio systems, receiving critical emergency broadcasts, and placing telephone calls, among others.

Certain environmental conditions, such as vehicle speed, interior noise, lighting conditions, and weather conditions, among others, can affect a driver's concentration level and may affect the driver's ability to pay attention to and comprehend TTS voice prompts. Some existing systems attempt to compensate for certain environmental conditions while generating TTS voice prompts for automotive vehicles. For example, some systems monitor vehicle speed or other vehicle operating parameters and attempt to schedule messages for time periods when a driver will be better equipped to listen to them, such as when a driver is stopped or moving slowly. Other systems relating to vehicle navigation may use vehicle speed and estimated driver reaction times to give verbal instructions, such as "turn right," at appropriate times.

A co-pending application by the same inventors entitled, "VARIABLE TEXT-TO-SPEECH FOR AUTOMOTIVE APPLICATION," and incorporated herein by reference, describes a system addressing the problem that in responding to changing environmental conditions, a driver may be required to put more concentration into driving and controlling a vehicle, leaving less mental power available for other activities, including listening to and concentrating on a TTS system. In fact, under stressful driving conditions, a driver may perceive a slower TTS voice as being normal and a normal-speed voice as being too fast. On the other hand, under non-stressful conditions, a driver may require less mental effort, and a slower TTS voice may irritate or bore the driver. Likewise, other parameters of a TTS voice, such as pitch or volume, may also require tuning to optimize intelligibility to a driver under different environmental conditions. The above-referenced co-pending application provides a system that analyzes vehicle sensor data in order to apply corrections to various parameters of the TTS synthesized voice, such as voice speed, pitch, and volume, among others, to compensate for environmental conditions to achieve improved intelligibility across a wide variety of vehicle operating conditions.

However, when environmental or operating conditions change abruptly, applying calculated changes to a TTS system immediately can cause discontinuous changes in the character of a TTS voice that can be distracting to an operator of a vehicle. For example, while a slower speed of a TTS voice may not be noticeable to a driver under stressful driving conditions, an abrupt change from a normal to a slower-speed voice, as a driver accelerates, for example, may be noticeable and distracting. Thus, it would be useful to provide a system that applies changes to the character of a TTS voice in a manner that efficiently achieves near-optimal performance of the character of a TTS voice while making changes in a way that is unnoticeable and non-distracting to a vehicle operator.

SUMMARY OF THE INVENTION

A first embodiment of a TTS control system in accordance with the present invention comprises one or more vehicle sensors for measuring operating states of an automotive vehicle, a TTS voice synthesizer for producing a TTS voice, a phrase database for providing data to the TTS voice synthesizer, and a TTS processing engine. The TTS processing engine includes a TTS parameter database that stores parameters for characterizing the voice synthesized by the TTS voice synthesizer. The TTS engine also includes a TTS parameter calculation module that calculates ideal values of the parameters that characterize the TTS voice for the particular operating states of the vehicle as measured by the vehicle sensors. The TTS engine also includes a phrase break module that is adapted to identify breaks between phrases sent by the phrase database to the TTS voice synthesizer. In should be appreciated that a phrase may include a word, a group of words, a sentence, a command, or similar collection of sounds that are to be synthesized by the TTS voice synthesizer in a substantially continuous manner. Phrase breaks appear between multiple phrases synthesized by the TTS voice synthesizer and are characterized by pauses in the audio output. The phrase break module is adapted to control an update of the TTS parameter database and may be configured to prevent the parameter database from being updated in the middle of a phrase. In other words, the phrase break detector may allow the parameter database to be updated with the value calculated by the parameter calculation module when a phrase break is detected, and it may prevent an update from occurring when no break is detected. In this manner, potential distractions to the driver of the vehicle may be reduced.

In one embodiment of a TTS control system in accordance with the present invention, the phrase database may include special control characters that indicate to the TTS synthesizer that it should produce a pause or break in the synthesized message. The phrase break detector may be adapted to identify such control characters in order to determine that a phrase break is occurring.

In another embodiment, the phrase break detector parses messages sent to the TTS synthesizer and processes them in a manner similar to that of the synthesizer and identifies phrase breaks by noting a lack of commanded audio output. In such an embodiment, it may be advantageous to supply the phrase break detector with TTS message data that is advanced in time with respect to that sent to the TTS synthesizer in order to account for time delays in determining whether a phrase break is occurring.

In an alternative embodiment of a TTS control system, the TTS processing engine includes a parameter damping module adapted to apply a filter to the calculated values of the TTS voice characterization parameters. The damping operation is intended to reduce the rate and/or the maximum excursions of voice characterization parameters to prevent a change from being applied that is so large as to be jarring or distracting to the driver of the vehicle. In one embodiment of a damping module, calculated values of characterization parameters are subjected to a moving-average filter that averages the currently calculated value of each voice characterization parameter with several previous calculations of that value. This damping operation creates a low-pass filter that tends to smooth out some of the fastest variations in the values taken on by the voice characterization parameters.

In another embodiment of a damping module, the calculated parameter values are subjected to a slew-rate limiter. The slew-rate limiter sets a maximum rate at which a given parameter is allowed to vary. If the calculation of a new value for the parameter would result in a change greater than the slew rate would allow, the calculated value is limited to a smaller change consistent with the slew-rate limit.

In yet another embodiment of a damping module, the calculated parameter values are subjected to an exponential-decay filter that applies a decaying exponential time constant to changes in the calculated values. The time constant can be set to any value dictated by the requirements of the application.

Many other embodiments of damping modules are also possible, and other types of filtering operations that tend to smooth out rapid variations in parameter changes, such as low-pass filters and band-pass filters, would also fall within the scope and spirit of the present invention. Embodiments of TTS control systems that employ only a phrase break detector, only a damping module, or both a phrase break detector and a damping module also fall within the scope and spirit of the present invention.

In one embodiment of a TTS control system that includes both a phrase break detector and a damping module, the phrase break detector operates to prevent update of voice characterization parameters in the middle of a synthesized phrase. During a phrase break, a calculated value that has been processed by the damping module may be used to update the TTS parameter database in order to control the character of the TTS synthesized voice. When multiple voice characterization parameters are being controlled, each may be processed independently. Some parameters may be processed through a phrase break detector only, others by a damping module only, and others by both a phrase break detector and a damping module.

Further advantages and possible embodiments of the present invention will become clear to those skilled in the art by study of the following detailed description and the attached sheets of drawing that will first be described briefly.

DETAILED DESCRIPTION OF THE PREFERRED EMBODIMENT

Figure 1:
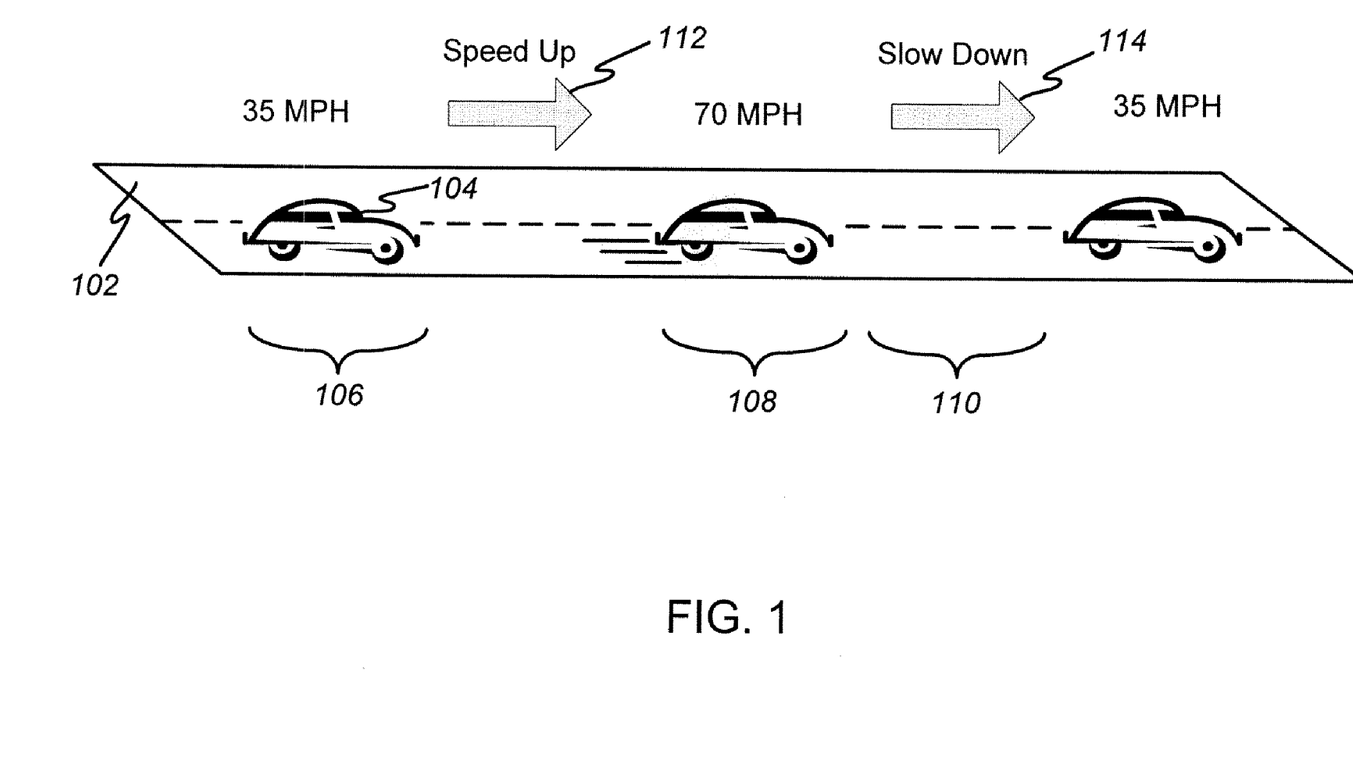
FIG. 1 depicts a typical driving scenario in which a vehicle operator uses a TTS system in different operating environments.

A text-to-speech (TTS) system for automotive vehicles is presented that allows for tuning of TTS speech parameters to improve intelligibility across a wide variety of driving conditions while minimizing the distraction to a driver associated with abruptly changing characteristics of a TTS voice. A typical driving scenario is depicted in FIG. 1. A vehicle 104 travels along a road 102. During a first time interval 106, the vehicle is moving at thirty-five miles per hour with minimal environmental noise resulting from the operation of the engine, the tires on the road, and the interaction of wind with the chassis. During interval 106, the driver may be relatively relaxed and not under considerable stress. When the driver uses the TTS system during interval 106, the characteristics of the TTS voice may be set accordingly. For example, a speed of the synthesized voice may be set relatively high, the volume set relatively low, and the pitch and other properties of the synthesized voice set to desirable levels for this environmental condition.

The vehicle 104 then accelerates 112 to seventy miles per hour, and the driver again uses the TTS system during interval 108. The increased speed of the vehicle may increase the driver's stress and concentration levels and also increase engine, road, and wind noise. Accordingly, the speed of the synthesized TTS voice may be reduced to take into account the increased stress level of the driver, and the volume may be increased to compensate for the increased noise level due to the increased speed.

The vehicle then decelerates 114 back down to thirty-five miles per hour, and during this deceleration time interval 110, the driver may again use the TTS system. Ideally, because the driver's stress level may be dropping due to the decreasing speed, the speed of the synthesized voice should begin to increase, and because the noise levels are reducing, the volume should be decreasing. However, if these changes are applied while the TTS system is synthesizing a phrase, the changes to the voice characteristics may be very noticeable to the driver and quite distracting. Instead, it is advantageous to apply a damping mechanism that smoothes out abrupt changes to voice characteristics and to selectively apply changes during natural breaks in the phrasing of TTS messages to minimize distraction of the driver.

Figure 2:
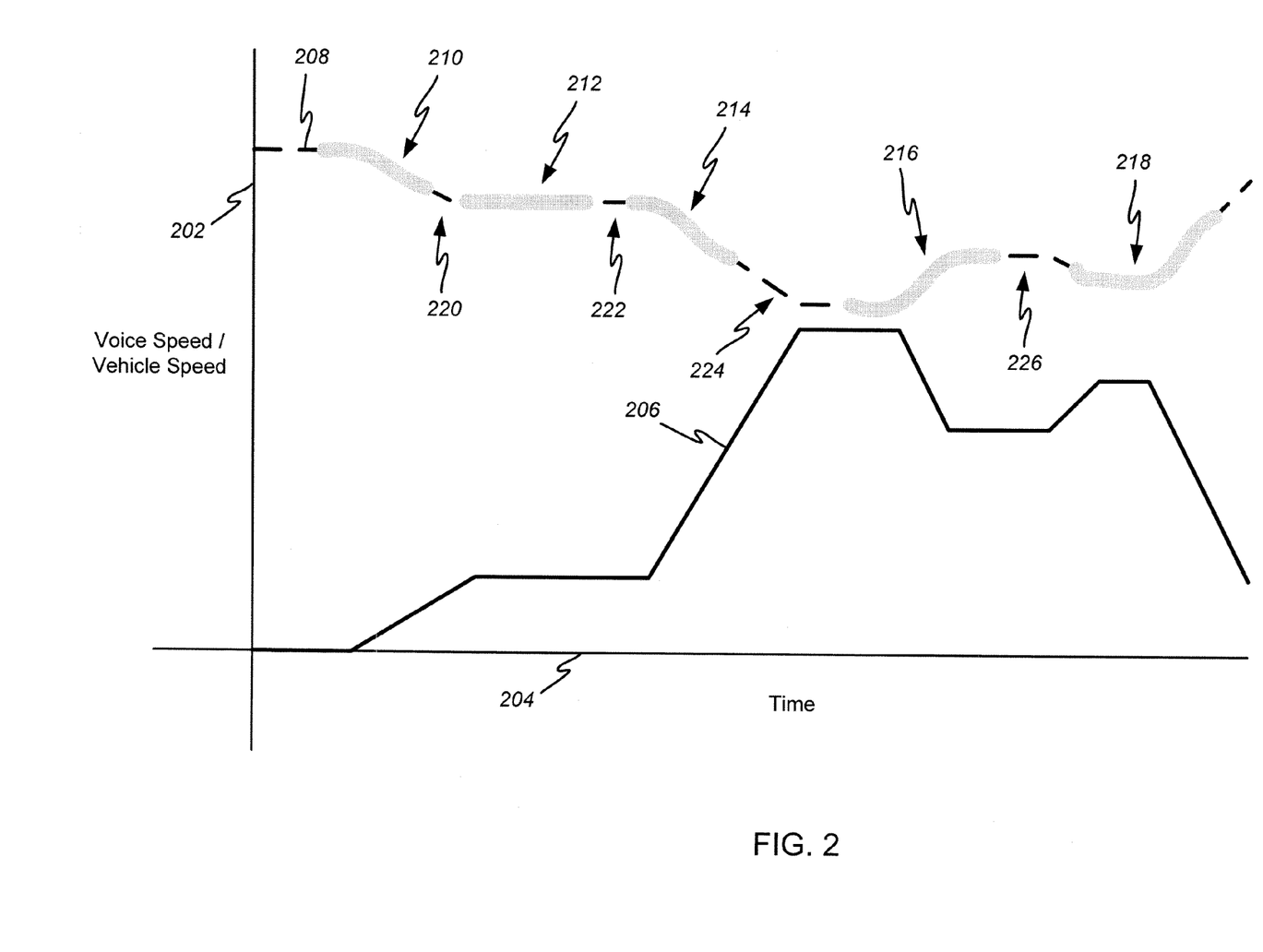
FIG. 2 depicts a variation of an exemplary TTS audio parameter with vehicle speed.

FIG. 2 provides a typical example of how a single TTS voice characteristic, voice speed, might be correlated with vehicle speed when a variable TTS system is employed, such as that described in the previously referenced co-pending application. The vehicle speed and TTS voice speed are plotted along a vertical axis 202, and elapsed time is plotted along a horizontal axis 204. The speed of the vehicle is indicated by the solid trace 206, and the speed of the TTS voice is indicated by the dashed trace 208. The TTS system is assumed to be on continuously during the time period depicted in FIG. 2, and the highlighted portions of trace 208, i.e., 210, 212, 214, 216, and 218 indicate phrases of a TTS message played out during this time period. Between the phrases are natural breaks 220, 222, 224, and 226, corresponding to normal pauses in the TTS voice output, such as at the ends of phrases or sentences. From the dashed trace 208, it is evident that some phrases fall within a time interval during which no adjustment commands are send to the TTS voice synthesizer. For example, phrase 212 begins and ends within a time interval in which the vehicle speed does not change, and accordingly, no TTS adjustment commands need to be sent. On the other hand, phrases 210, 214, 216, and 218 all span time intervals during which the vehicle speed changes. If the speed of the TTS voice were to follow the ideal speed corrections, the voice speed would change during these phrases, and the result could be jarring and distracting to the vehicle operator.

Figure 3:
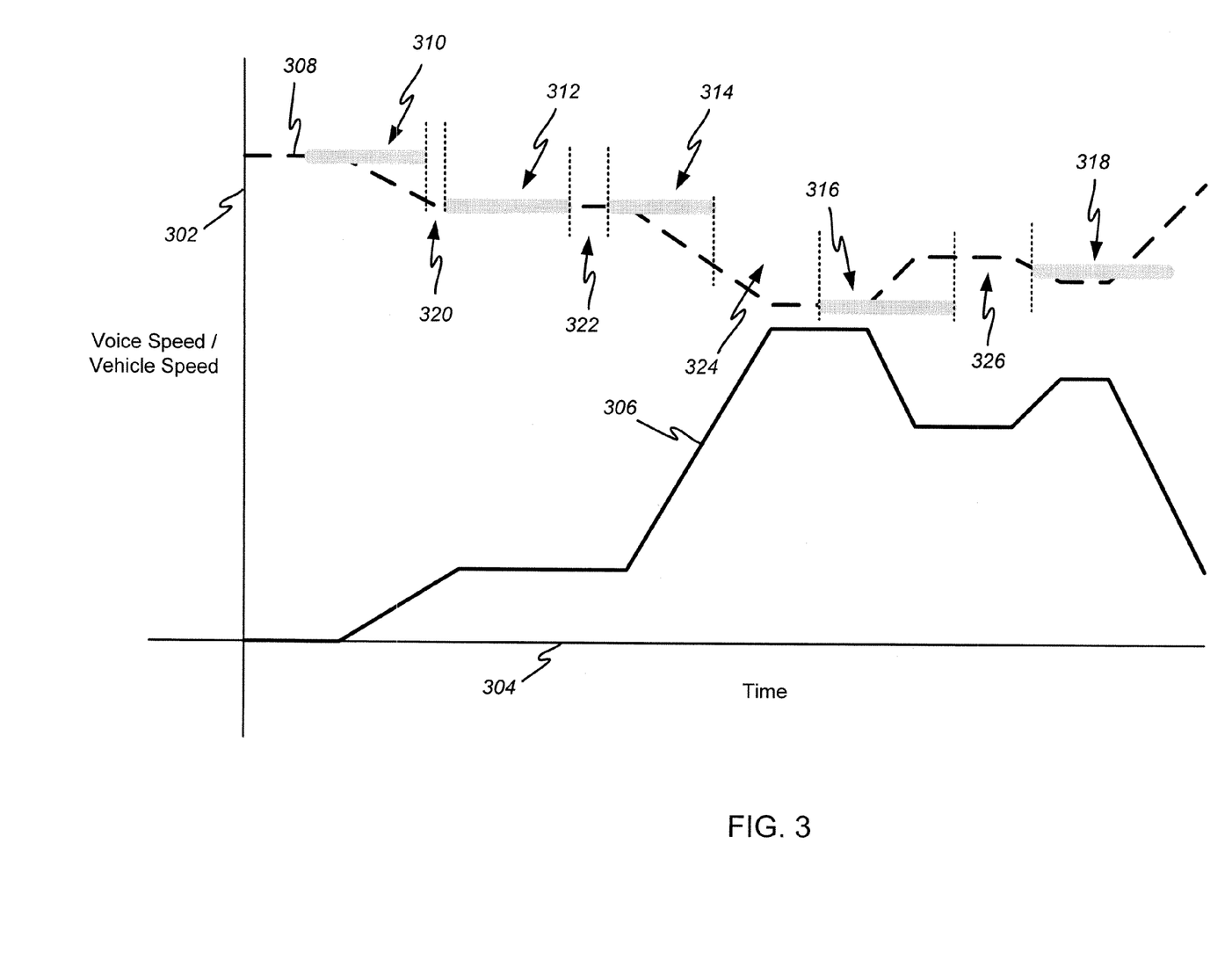
FIG. 3 depicts a variation of an exemplary TTS audio parameter with vehicle speed wherein TTS audio parameter corrections are applied at phrase breaks, according to an embodiment of the present invention.

A first object of the invention is to prevent such jarring modifications of TTS voice characteristics by timing TTS voice updates to occur only during natural phase breaks. FIG. 3 illustrates the same plot of vehicle speed and TTS voice speed as a function of time, but illustrates the application of voice speed changes only at phase breaks, in accordance with an embodiment of the present invention. TTS voice speed and vehicle speed are plotted along a vertical axis 302, and elapsed time is plotted along a horizontal axis 304. Solid trace 306 indicates the speed of the vehicle, and dashed trace 308 indicates the ideal corrected TTS voice speed when compensated for vehicle speed. TTS phrases output by the TTS voice synthesizer are highlighted at 310, 312, 314, 316, and 318. Natural pauses or phrase breaks are indicated at 320, 322, 324, and 326. In accordance with an embodiment of the present invention, corrections to TTS voice speed are applied only during phase breaks. For example, during phase break 322, the TTS voice speed is adjusted to lie along ideal voice speed trace 308. But when the phrase indicated at 314 begins, the TTS voice speed is not updated again until phase break 324 begins. Thus, the TTS voice speed remains constant during the synthesis of phrase 314, and the vehicle operator does not hear a voice that changes speed in the middle of a phrase. When the following phrase 316 begins, the TTS voice speed has been adjusted lower but again remains constant throughout the duration of the phrase. The vehicle operator is thus less likely to notice the change in speed and is less likely to be jarred or distracted by the changed characteristics of the synthesized voice. Of course, voice speed is only one parameter that may be fixed except during phase breaks. Similar techniques may be used with TTS voice volume, TTS voice pitch, or any other parameters that are tuned in response to a state of the vehicle to improve intelligibility. Similarly, the variation of such parameters with vehicle speed is an illustrative example and is not meant to limit the scope of the invention. Other vehicle operating parameters and environmental parameters, such as interior noise levels, lighting and visibility conditions, and road roughness conditions, among others, may also guide the variation of TTS audio parameters within the scope and spirit of the present invention.

Figure 4:
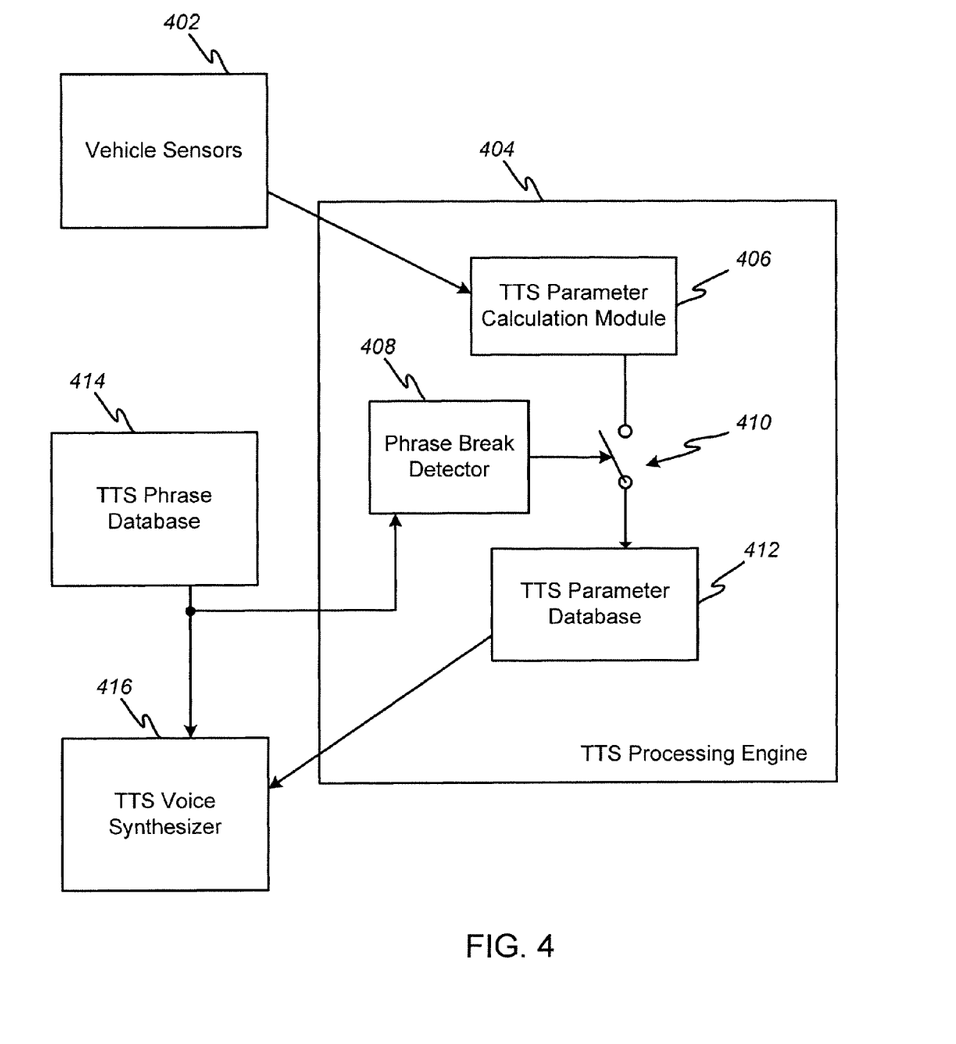
FIG. 4 is a block diagram of an embodiment of the present invention that applies corrections at breaks between synthesized TTS phrases.

FIG. 4 depicts a block diagram of an embodiment of a variable TTS system in accordance with the present invention that synchronizes TTS voice characteristic updates with natural phase breaks in synthesized messages. A TTS processing engine 404 receives inputs from one or more vehicle sensors 402 that provide an indication of such vehicle state parameters as vehicle speed, interior vehicle noise, and lighting conditions, among others. A TTS parameter calculation module 406 calculates ideal updates to TTS parameters, such as volume, speed, and pitch, among others, that would compensate for the vehicle state sensed by the vehicle sensors to produce a TTS voice that is more intelligible to the driver. However, these calculated voice parameters are not immediately and unconditionally stored in the TTS parameter database 412. Instead, a phase break detector 408 operates to selectively enable the updating of the TTS parameter database 412 only during natural breaks in the TTS voice stream, as indicated schematically by switch 410. The phrases to be synthesized are stored in a TTS phrase database 414 and are passed to a TTS voice synthesizer 416 when they are scheduled to be presented to the driver of the vehicle. The phrases are also passed to the phase break detector 408, and when a break is detected, switch 410 is closed, allowing the TTS parameter database to be updated with the current calculated set of ideal parameters from the TTS parameter calculation module 406. The phrase break detector 408 can operate in a number of different ways. In one embodiment, the phase break detector 408 reads special control characters provided from the TTS phrase database 414 that indicate pauses in the voice stream. In another embodiment, the phase break detector 408 parses phrases sent from the TTS phrase database in a manner similar to that of the TTS voice synthesizer 416 and detects pause periods, during which it closes switch 410. In the latter case, it may be advantageous to provide the phase break detector 408 with a voice stream running slightly ahead of the one feeding the TTS voice synthesizer 416 in order to account for time delays in making the determination that a natural pause is occurring. Other methods of determining where pauses occur would also fall within the scope and spirit of the present invention.

TTS voice parameters stored in the TTS parameter database 412 are regularly loaded into the TTS voice synthesizer 416 to affect the speed, volume, pitch, and other characteristics of the synthesized voice. However, because the parameter database is updated only during natural phase breaks, the voice characteristics are also updated only during phase breaks. Of course, other methods of freezing the update of voice characteristics except during phrase breaks are also possible and would fall within the scope and spirit of the present invention. It should also be appreciated that a TTS processing engine with additional or fewer components than the embodiment described above would also fall within the scope and spirit of the present invention. For example, an embodiment of a TTS processing engine in accordance with the present invention could include a TTS parameter calculation module 406 that is adapted to perform the functions of the phrase break detector 408 and the switch 410. Other combinations and variations of a system that updates TTS voice characteristics during phrase breaks would also fall within the scope of the present invention.

Often during the course of vehicle operation, changes to vehicle state parameters occur very rapidly. For example, a vehicle may accelerate or decelerate very quickly; a window may be opened and then closed, increasing and then decreasing interior vehicle noise, etc. Under these rapidly changing conditions, it may be undesirable for a TTS system to react immediately by changing voice characteristic parameters because this may be distracting to an operator of the vehicle. Thus, it is a second object of the present invention to provide a damping system that introduces a settling time constant into the response of the TTS processing engine to prevent excessively rapid changes in TTS voice characteristics from distracting a vehicle operator.

Figure 5:
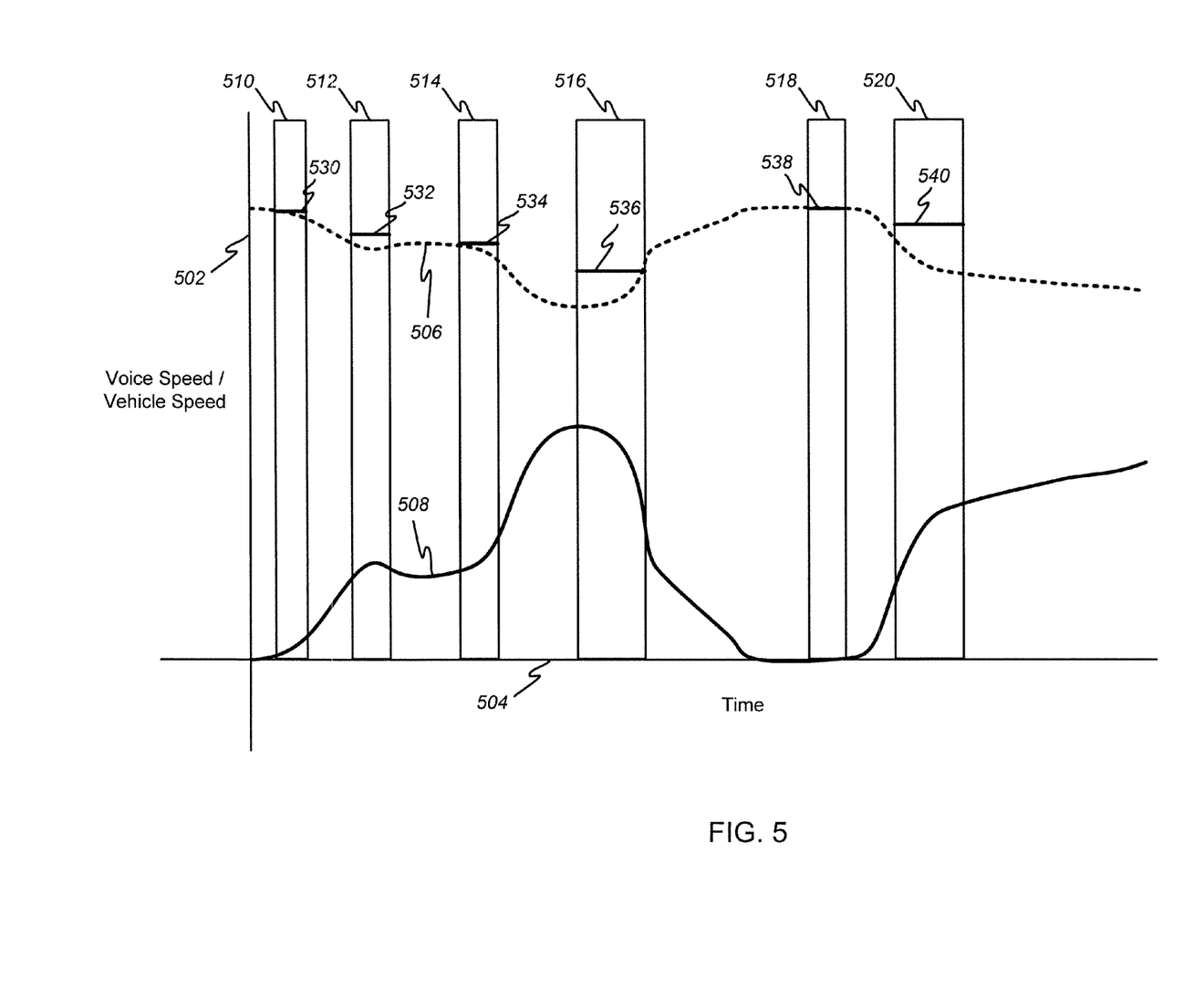
FIG. 5 depicts a variation of an exemplary TTS audio parameter with vehicle speed wherein a damping module is operative according to an embodiment of the present invention.

FIG. 5 illustrates the operation of a TTS parameter damping function in accordance with the present invention. TTS voice speed and vehicle speed are plotted along a vertical axis 502, and elapsed time is plotted along a horizontal axis 504. A representative vehicle speed trace 508 indicates a possible vehicle speed profile. Dashed trace 506 indicates an ideal TTS voice speed that would compensate for the vehicle speed profile depicted in the figure. The shaded intervals 510, 512, 514, 516, 518, and 520 indicate periods during which the TTS system is active, playing a synthesized voice for the driver of the vehicle. An embodiment of a damping system in accordance with the present invention is active and acts to limit the extent to which TTS voice parameters can change between active TTS sessions. For example, solid line 532 indicates the TTS voice speed that is set during TTS-active interval 512.

Voice speed 532 lies slightly above the ideal voice speed trace 506 because the active damping mechanism tends to limit how quickly this parameter may change in response to changing vehicle speed or other vehicle parameters. Because the ideal voice speed trace 502 is dropping between active intervals 510 and 512, the voice speed 532 that is set during interval 512 will tend to be slightly higher than the instantaneous ideal voice speed. The more limited distance between voice speed 530, set during interval 510, and voice speed 532, set during interval 512, will be less jarring and less noticeable to the operator of the vehicle.

Figure 6:
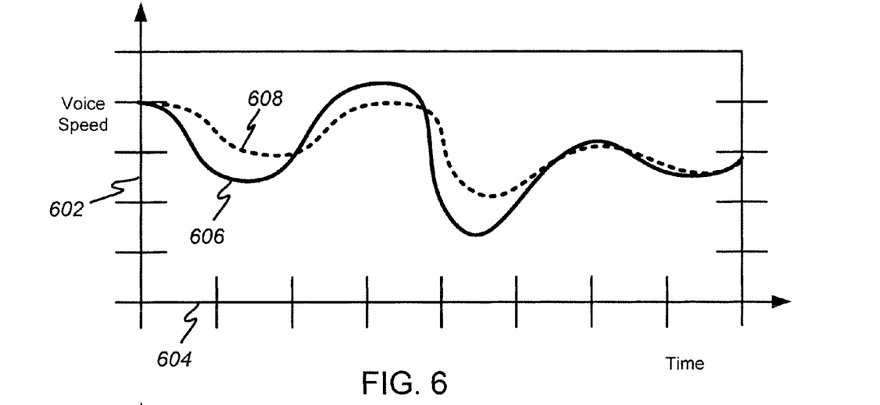
FIGS. 6-8 depict the operation of alternative embodiments of a damping module in accordance with the present invention.
Figure 7:
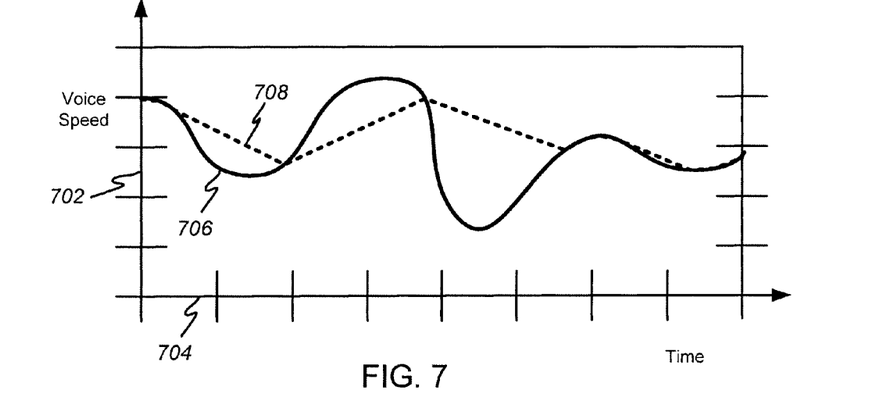
Figure 8:
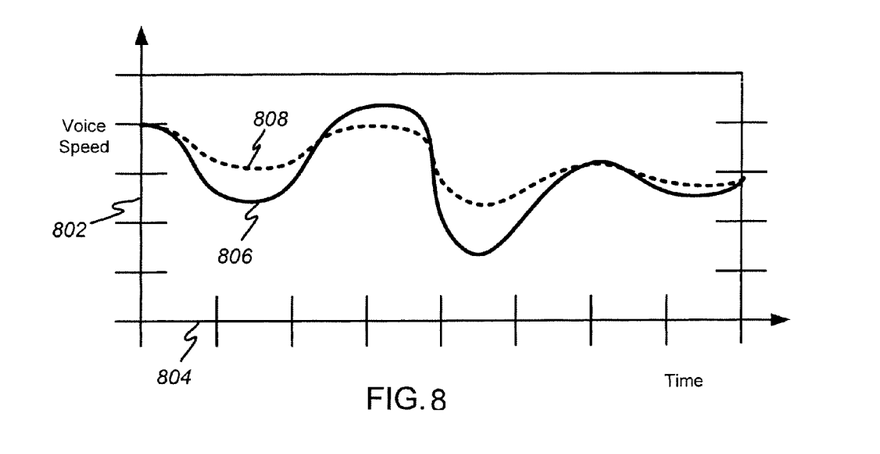

The mechanisms for implementing the damping function are varied. For example, a moving average can be employed to average an ideal voice parameter over a certain number of preceding seconds, creating a low-pass-filtered version of the ideal voice parameter value that tends to smooth out the more rapid excursions in its value. Alternatively, changes in voice parameters can be slew-rate limited to limit the maximum rate of change of a voice parameter to a value that is not likely noticeable to the vehicle operator. In another embodiment, an exponential time constant can be applied to changes in the value of a voice parameter. FIGS. 6, 7, and 8 compare these different embodiments of a damping function in accordance with the present invention.

FIG. 6 is a plot of an ideal voice speed curve 606 in which voice speed is plotted along a vertical axis 602, and elapsed time is plotted along a horizontal axis 604. An embodiment of a damping module that employs a moving time average is used to generate a damped voice speed curve represented by the dashed trace 608. In this embodiment, the damping module calculates a present value of the damped voice speed curve 608 by calculating a time average of the ideal voice speed curve 606 during the preceding N seconds, where N can be set to any desired number of seconds according to the level of averaging that is required.

FIG. 7 depicts a voice speed curve processed by an alternative embodiment of a damping module that employs slew-rate limiting. In this embodiment, the damping module limits the maximum rate of change of the voice speed parameter to a rate that is not likely to distract the vehicle operator. When the ideal voice speed curve 706 changes at a rate slower than the maximum slew rate, the damped voice speed curve 708 follows the ideal curve. But when the ideal curve changes at a rate faster than the maximum slew rate, the damped curve moves toward the ideal curve at the maximum allowed slope, smoothing out the fast variations in the ideal voice speed curve. The maximum slew rate can be set according to the requirements of the particular application.

FIG. 8 is a plot of a voice speed curve processed by another embodiment of a damping module that employs an exponential time constant filter to smooth the variations of the ideal voice speed curve 806 to generate a damped voice speed curve 808. In this case, the instantaneous difference between the damped curve 808 and the ideal curve 806 is multiplied by an exponential decay factor proportional to $e^{-\alpha t}$, where $\alpha$ is a time constant that can be adjusted depending on the filtering requirements of the application.

Other methods of implementing a damping function are possible and would also fall within the scope and spirit of the present invention. For systems including the adjustment of multiple voice parameters, such as voice speed, voice pitch, and voice volume, for example, different combinations of damping methods can be employed for each of the parameters requiring damping.

Figure 9:
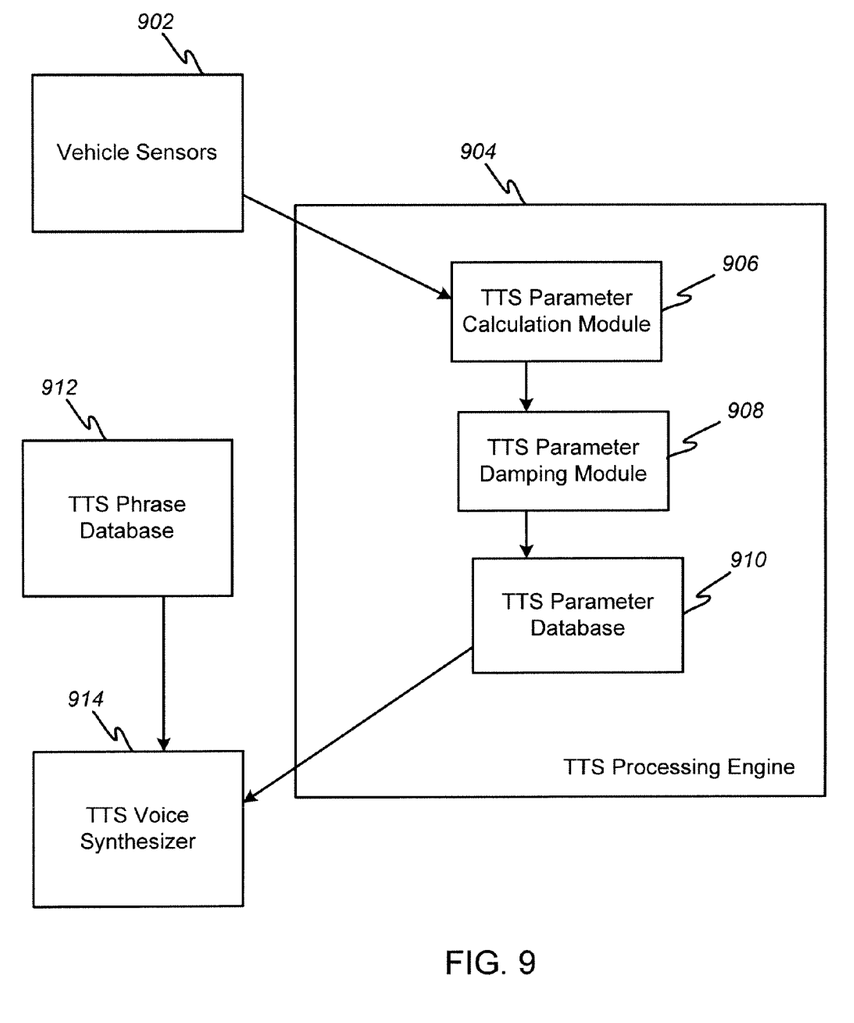
FIG. 9 is a block diagram of an embodiment of the present invention including a damping module.

FIG. 9 is a block diagram of an embodiment of a TTS control engine in accordance with the present invention that includes a damping module. The TTS processing engine 904 receives inputs from one or more vehicle sensors 902. Based on the state of the vehicle as determined by the sensor inputs, the TTS parameter calculation module 906 calculates ideal values of TTS voice parameters, such as voice speed, voice volume, and voice pitch, among others. The calculated parameter values are then passed to parameter damping module 908 for the purpose of reducing the rate and/or the magnitude of TTS voice parameter excursions in order to present a profile to the TTS parameter database 910 that is less likely to jar or distract the driver of the vehicle. The TTS voice parameters in the TTS parameter database are applied to the TTS voice synthesizer 914 and govern the characteristics of the synthesized voice that generates phrases supplied by the TTS phrase database 912. The parameter damping module 908 may include a moving-average filter, a slew-rate-limiting filter, an exponential-decay filter, or any other type of filter designed to have a generally low-pass or band pass character. Other types of filters that generally produce a smoothing of voice parameter variations would also lie within the scope and spirit of the present invention.

While FIG. 9 and FIG. 4 depict embodiments of a TTS processing engine that include either a damping module or a phrase-break-detector module, respectively, embodiments of systems in accordance with the present invention may also include both a damping module and a phrase-break-detector module. Furthermore, other embodiments of a TTS processing engine may include a combination of phrase-break detectors and damping modules that are operative with respect to different combinations of TTS voice parameters. For example, voice speed parameters might be subject to both a phrase-break-detector module as well as a damping module, and voice volume parameters might be subjected to only a phrase-break-detector module. Other such variations and combinations would also fall within the scope and spirit of the present invention.

The foregoing description has presented several embodiments of a system for actively optimizing TTS speech synthesis to improve intelligibility of voice prompts in an automotive vehicle application while minimizing distractions to the driver. Other embodiments and advantages of the invention may be apparent to those skilled in the art, and such would lie within the scope and spirit of the present invention. The invention is further defined by the following claims.

What is claimed is:

1. A text-to-speech (TTS) control system for use in an automotive vehicle comprising:
   at least one vehicle sensor adapted for measuring at least one operating state of the automotive vehicle;
   a TTS voice synthesizer for synthesizing a TTS voice;
   a TTS phrase database operatively coupled to the TTS voice synthesizer for providing data to be synthesized, the data comprising at least a plurality of phrases; and
   a TTS processing engine comprising:
      a TTS parameter database operatively coupled to the TTS voice synthesizer and adapted for storing at least one TTS voice parameter for controlling a characteristic of the TTS voice;
      a TTS parameter calculation module operatively coupled to the at least one vehicle sensor and adapted for calculating a value of the at least one TTS voice parameter based on the at least one operating state of the automotive vehicle; and
      a phrase break detector operatively coupled to the TTS phrase database and adapted for detecting at least one break in the plurality of phrases and for controlling an update of the at least one TTS voice parameter stored in the TTS parameter database with the value of the at least one TTS voice parameter calculated by the TTS parameter calculation module.

2. The TTS control system of claim 1, wherein the phrase break detector is further adapted for preventing the update of the at least one TTS voice parameter stored in the TTS parameter database when at least one of the plurality of phrases is being synthesized by the TTS voice synthesizer and for allowing the update of the at least one TTS voice parameter when none of the plurality of phrases is being synthesized by the TTS voice synthesizer.

3. The TTS control system of claim 1, wherein the data provided by the TTS phrase database includes at least one control character for identifying the at least one break.

4. The TTS control system of claim 3, wherein the phrase break detector is further adapted for decoding the at least one control character to identify the at least one break.

5. The TTS control system of claim 1, wherein the phrase break detector is further adapted to parse the data provided by the TTS phrase database to identify the at least one break.

6. A text-to-speech (TTS) control system for use in an automotive vehicle comprising:
   at least one vehicle sensor adapted for measuring at least one operating state of the automotive vehicle;
   a TTS voice synthesizer for synthesizing a TTS voice;
   a TTS phrase database operatively coupled to the TTS voice synthesizer for providing data to be synthesized; and
   a TTS processing engine comprising:
      a TTS parameter database operatively coupled to the TTS voice synthesizer and adapted for storing at least one TTS voice parameter for controlling a characteristic of the TTS voice;
      a TTS parameter calculation module operatively coupled to the at least one vehicle sensor and adapted for calculating a value of the at least one TTS voice parameter based on the at least one operating state of the automotive vehicle; and
      a TTS parameter damping module adapted for filtering the value of the at least one TTS voice parameter calculated by the TTS parameter calculation module and for controlling an update of the at least one TTS voice parameter stored in the TTS parameter database.

7. The TTS parameter damping module of claim 6, further comprising a moving-average filter adapted for averaging the value of the at least one TTS voice parameter calculated by the TTS parameter calculation module with values of the at least one TTS voice parameter calculated by the TTS parameter calculation module at previous times.

8. The TTS parameter damping module of claim 6, further comprising a slew rate limiter adapted for limiting a rate at which the value of the at least one TTS voice parameter calculated by the TTS parameter calculation module may change.

9. The TTS parameter damping module of claim 6, further comprising an exponential-time-decay filter for limiting a rate at which the value of the at least one TTS voice parameter calculated by the TTS parameter calculation module may change by the application of a decaying exponential time constant.

10. A text-to-speech (TTS) control system for use in an automotive vehicle comprising:
    at least one vehicle sensor adapted for measuring at least one operating state of the automotive vehicle;
    a TTS voice synthesizer for synthesizing a TTS voice;
    a TTS phrase database operatively coupled to the TTS voice synthesizer for providing data to be synthesized, the data comprising at least a plurality of phrases; and
    a TTS processing engine comprising:
       a TTS parameter database operatively coupled to the TTS voice synthesizer and adapted for storing at least one TTS voice parameter for controlling a characteristic of the TTS voice;
       a TTS parameter calculation module operatively coupled to the at least one vehicle sensor and adapted for calculating a value of the at least one TTS voice parameter based on the at least one operating state of the automotive vehicle;
       a phrase break detector operatively coupled to the TTS phrase database and adapted for detecting at least one break in the plurality of phrases and for controlling an update of the at least one TTS voice parameter stored in the TTS parameter database; and
       a TTS parameter damping module adapted for filtering the value of the at least one TTS voice parameter calculated by the TTS parameter calculation module and for further controlling the update of the at least one TTS voice parameter stored in the TTS parameter database.

11. The TTS control system of claim 10, wherein the phrase break detector is further adapted for preventing the update of the at least one TTS voice parameter stored in the TTS parameter database when at least one of the plurality of phrases is being synthesized by the TTS voice synthesizer and for allowing the update of the at least one TTS voice parameter when none of the plurality of phrases is being synthesized by the TTS voice synthesizer.

12. The TTS control system of claim 10, wherein the data provided by the TTS phrase database includes at least one control character for identifying the at least one break.

13. The TTS control system of claim 12 wherein the phrase break detector is further adapted for decoding the at least one control characters to identify the at least one break.

14. The TTS control system of claim 10, wherein the phrase break detector is further adapted to parse the data provided by the TTS phrase database to identify the at least one break.

15. The TTS parameter damping module of claim 10, further comprising a moving-average filter adapted for averaging the value of the at least one TTS voice parameter calculated by the TTS parameter calculation module with values of the at least one TTS voice parameter calculated by the TTS parameter calculation module at previous times.

16. The TTS parameter damping module of claim 10, further comprising a slew rate limiter adapted for limiting a rate at which the value of the at least one TTS voice parameter calculated by the TTS parameter calculation module may change.

17. The TTS parameter damping module of claim 10, further comprising an exponential-time-decay filter for limiting a rate at which the value of the at least one TTS voice parameter calculated by the TTS parameter calculation module may change by the application of a decaying exponential time constant.

18. In an automotive vehicle equipped with a text-to-speech (TTS) control system adapted to adjust characteristics of a TTS voice in response to a measured state of the automotive vehicle, a method of adjusting at least one TTS voice characteristic while reducing distraction to an operator of the automotive vehicle includes the steps of:
    measuring at least one operating state of the automotive vehicle;

calculating a value of at least one parameter characterizing the TTS voice to produce a calculated value based on the measured operating state of the automotive vehicle such that intelligibility of the TTS voice would be increased;

processing a message to be synthesized by the TTS voice synthesizer to detect at least one break within the message to be synthesized;

storing a processed value in a memory device wherein the processed value is equal to a previous value of the at least one parameter if the at least one break is not yet detected and is equal to the calculated value if the at least one break is detected; and applying the processed value to a TTS voice synthesizer.

19. The method of claim 18, wherein the step of processing a message to be synthesized further comprises the step of identifying at least one control character within the message indicating the at least one break.

20. The method of claim 18, further comprising the steps of:

damping a change in the calculated value of the at least one parameter by applying a filtering operation to produce a damped value; and setting the calculated value equal to the damped value.

21. The method of claim 20, wherein the step of damping a change in the calculated value further comprises the step of applying a moving-average filter to average the calculated value with at least one previous value of the at least one parameter to produce a damped value.

22. The method of claim 20, wherein the step of damping a change in the calculated value further comprises the step of applying a slew-rate-limiter to limit a maximum rate of change of calculated value with respect to previous values of the at least one parameter to produce a damped value.

23. The method of claim 20, wherein the step of damping a change in the calculated value further comprises the step of applying an exponential-time-decay filter to the calculated value to produce a damped value.

24. The method of claim 20 wherein the step of processing a message to be synthesized by the TTS voice synthesizer further comprises the step of identifying at least one control character within the message indicating the at least one break.

25. The method of claim 24, wherein the step of damping a change in the calculated value further comprises the step of applying a moving-average filter to average the calculated value with at least one previous value of the at least one parameter to produce a damped value.

26. The method of claim 24, wherein the step of damping a change in the calculated value further comprises the step of applying a slew-rate-limiter to limit a maximum rate of change of calculated value with respect to previous values of the at least one parameter to produce a damped value.

27. The method of claim 24, wherein the step of damping a change in the calculated value further comprises the step of applying an exponential-time-decay filter to the calculated value to produce a damped value.

\* \* \* \* \*